United States Patent [19]

Dugas

[11] Patent Number: 4,717,131

[45] Date of Patent: Jan. 5, 1988

[54] WELDING CLAMP

[76] Inventor: David Dugas, 1603 Helena Ave., Nederland, Tex. 77627

[21] Appl. No.: 903,512

[22] Filed: Sep. 3, 1986

[51] Int. Cl.⁴ .............................................. B25B 1/20
[52] U.S. Cl. ...................................... 269/41; 269/243
[58] Field of Search ...................... 269/37, 41, 45, 60, 269/904, 91–94, 246, 243

[56] References Cited

U.S. PATENT DOCUMENTS

| | | | |
|---|---|---|---|
| 1,175,811 | 3/1916 | Ray | 269/91 |
| 1,831,082 | 11/1931 | Spilsburg | 269/45 |
| 2,360,417 | 10/1944 | Grenfell | 269/47 |
| 3,182,988 | 5/1965 | Woodall | 269/37 |
| 3,883,128 | 5/1975 | Breese | 269/45 |
| 4,300,754 | 11/1981 | Lawrence | 269/37 |
| 4,475,726 | 10/1984 | Smith | 269/93 |

Primary Examiner—Robert C. Watson
Attorney, Agent, or Firm—Gunn, Lee & Jackson

[57] ABSTRACT

The welding clamp is used to hold a first metal structure against a second metal structure for welding both structures together. A mounting bracket means having longitudinal rod means extending therefrom is temporarily tack welded to the first structure to support the welding clamp. In another embodiment, the welding clamp utilizes a mounting bracket means having a pair of L-shaped arms extending therefrom. The arms grip a pair of C-shaped channel members which are temporarily mounted by tack welds to one of the structures to be welded. In another embodiment, the welding clamps can be modified into a welding fixture particularly well suited for welding end brackets or other similar structures to tubular members.

9 Claims, 13 Drawing Figures

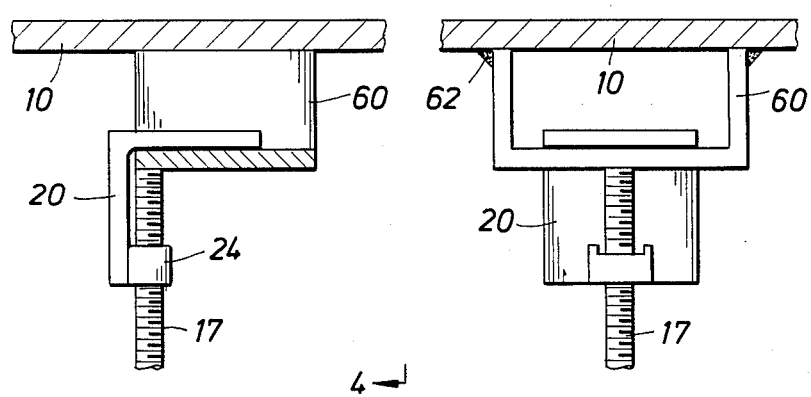
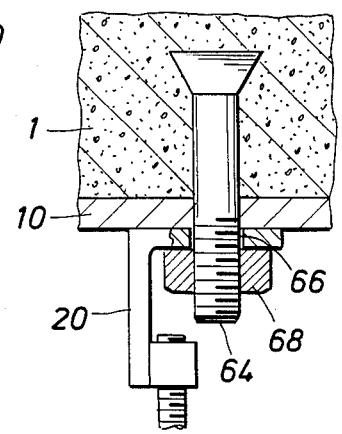
FIG. 4
FIG. 5
FIG. 3
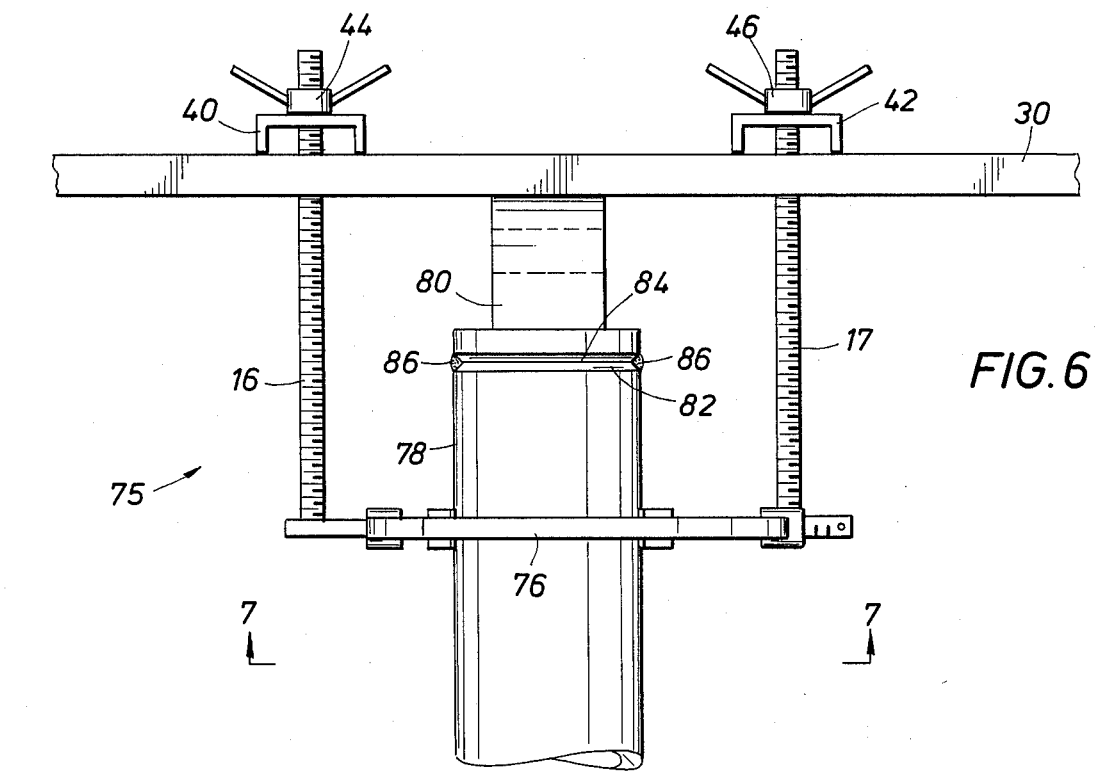
FIG. 6
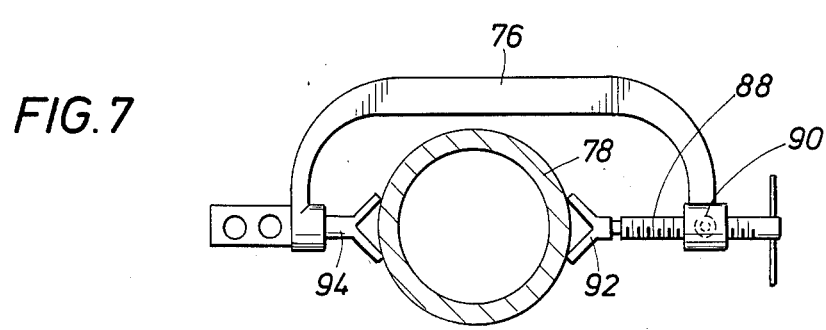
FIG. 7

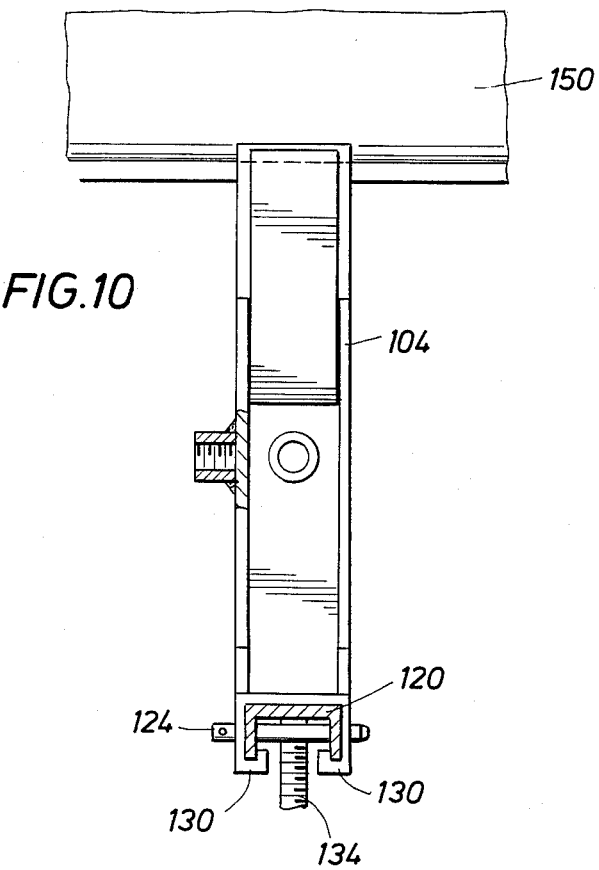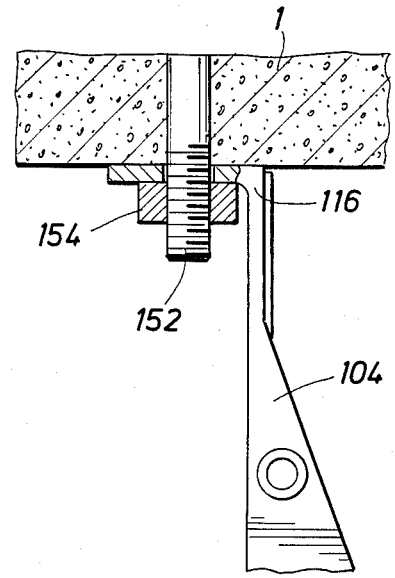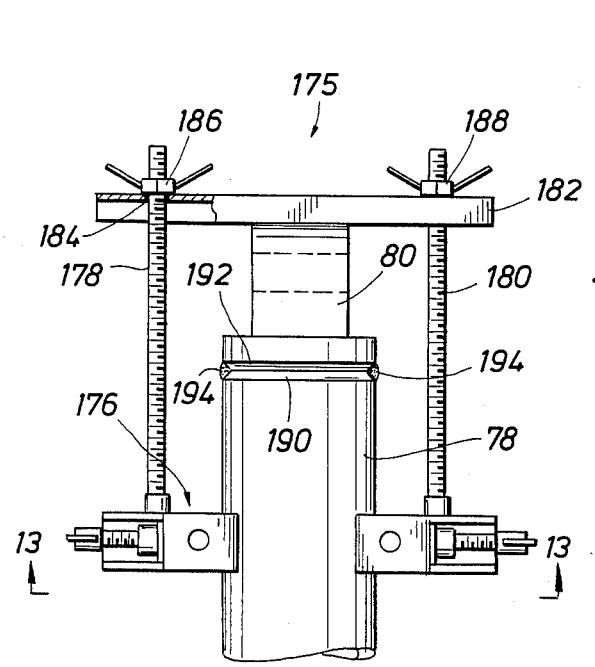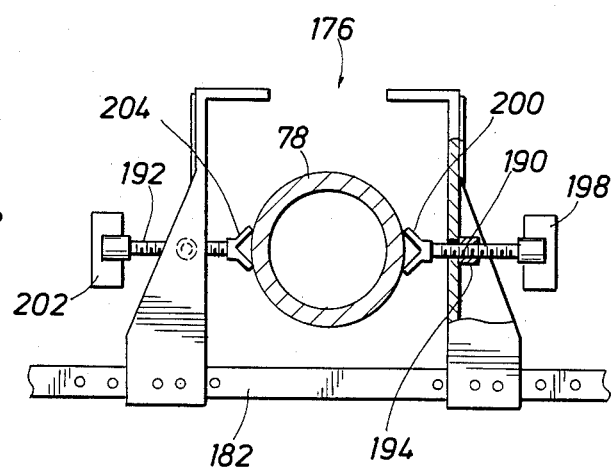

WELDING CLAMP

BACKGROUND OF THE DISCLOSURE

1. Field of the Invention

This invention relates to the field of welding clamps and other similar devices which can be used to hold two separate pieces of metal together for purposes of preheating and/or welding.

2. Description of the Prior Art

All sorts of welding clamps too numerous to mention are well-known in the prior art. In those situations when a mechanical clamp is not used, a helper will frequently hold to two pieces of metal together using a simple pair of gloves during the tack welding process. In those situations in which both pieces of metal must be concurrently preheated, a helper will sometimes hold the two pieces of metal together using a metal or wooden pole. These crude methods of positioning and holding two pieces of metal together are very cumbersome during the preheat process and tend to be inaccurate. In those cases where high-pressure vessels are being constructed or repaired or in the construction of nuclear power plants, the accurate fit of the two pieces of metal being welded is essential to proper functioning of the final apparatus. When accuracy is required, manual holding techniques are simply inadequate and inefficient. Other prior art welding clamps are believed to be inferior to the invention disclosed herein.

SUMMARY OF THE DISCLOSURE

The first embodiment of this welding clamp is a relatively light weight version which is easily carried by one man and is highly portable. The alternative embodiment can also be carried by one man; however, it is heavier and capable of supporting larger loads. Both embodiments have certain common elements, including mounting bracket means, an axial beam, a brace and means for positioning the brace relative to the beam. The mounting bracket means positions the welding clamp on a first metal structure which can either be in a horizontal or vertical plane. The axial beam is adjustably mounted and coacts with the mounting bracket means to form a U-shaped clamp. A brace and positioning means coact with the axial beam to complete the common structure. The brace contacts a second metal structure firmly pressing the first metal structure and the second metal structure together. This allows precise alignment of the second metal structure vis-a-vis the first metal structure. This also facilitates a safe and convenient preheat of both the first and second metal structures.

The aforementioned embodiments can also be used as a welding fixture particularly suited to hold a tubular member and end piece for preheat and/or welding.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

FIG. 3 is a partial cross-sectional view of an L-shaped base suspended from a C-shaped channel member.

FIG. 4 is a perspective view of the L-shaped base taken along line 4—4 of FIG. 3.

FIG. 5 is a partial perspective view of the L-shaped base attached to an anchor set in concrete.

FIG. 6 is a perspective view of a welding fixture holding a tubular member against an end bracket.

FIG. 7 is a perspective view of the clamp means taken along lines 7—7 of FIG. 6.

FIG. 10 is a partial cross-sectional view of the alternative embodiment of the welding clamp taken lines 10—10 of FIG. 9.

FIG. 11 shows a partial cross-sectional view of the L-shaped base of the alternative embodiment of the welding clamp mounted on an anchor which extends from a concrete wall.

FIG. 12 shows a partial perspective view of the welding fixture supporting a tubular member and an end bracket.

FIG. 13 is a perspective view of the welding fixture taken along lines 13—13 of FIG. 12.

DETAILED DESCRIPTION OF THE PREFERRED EMBODIMENT

Figure 1:
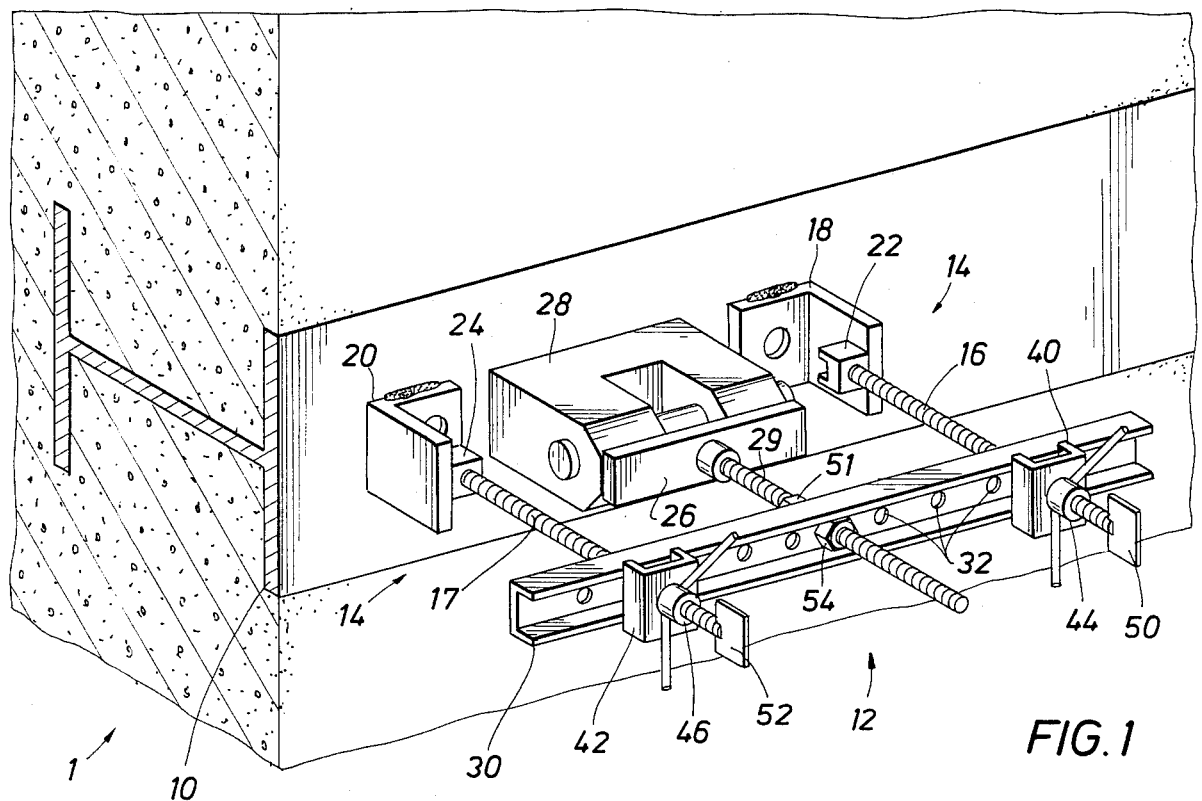
FIG. 1 is a perspective view of the welding clamp holding a beam attachment against an I-beam which is embedded in the vertical concrete wall. The I-beam is typically referred to as an embed.

Referring now to FIG. 1, a vertical concrete wall is generally identified by the numeral 1. A steel I-beam identified by the numeral 10 is shown embedded in the concrete wall 1. The steel I-beam 10 is generally referred to in the trade as an "embed" and will be henceforth so identified. The welding clamp is generally identified by the numeral 12. The welding clamp consists of a mounting bracket means generally identified by the numeral 14 having longitudinal rod means extending therefrom. The longitudinal rod means includes a pair of elongate bolts identified respectively as 16 and 17. The mounting bracket means includes a pair of L-shaped bases respectively identified as 18 and 20. A fitting 22 extends from and forms a part of the L-shaped base 18. The fitting 22 is contoured to receive and threadably engage the elongate bolt 16. A second fitting 24 extends from and forms a part of the second L-shaped base 20. The fitting 24 is contoured to receive and threadably engage the second elongate bolt 17. The fittings 22 and 24 are contoured to allow the bolts 16 and 17 to pass therethrough as better seen in FIG. 2.

A brace 26 has a longitudinal shaft 29 extending therefrom. The brace 26 presses against the beam attachment 28 holding it firmly in place on the embed 10. As shown in this configuration, the beam attachment 28 can be concurrently preheated and subsequently welded in precise alignment on the embed 10. In the case of nuclear power plants and other situations where precise positioning is important, this welding clamp presents an advance in the art.

An axial beam 30 adjustably engages the elongate bolts 16 and 17. The beam 30 is perforated by a plurality of perforations or holes 32 which allow for adjustment according to the size of the beam attachment 28 or other structure which is to be held in place. The longitudinal shaft 29 extending from the brace 26 also passes through one of the perforations 32 in the axial beam. 30. The plurality of holes 32 are sized to receive and allow the elongate bolts 16 and 17 and the shaft 29 to pass through the beam 30.

The welding clamp 12 has a means for positioning the axial beam 30 on the longitudinal rod means extending from the mounting bracket means 14. More specifically, the means for positioning the beam 30 includes a pair of blocks 40 and 42 which fit over elongate bolts respectively 16 and 17 and a pair of wing nuts 44 and 46 which respectively threadably engage elongate bolts 16 and 17. The block 40 is positioned between the axial beam 30 and the wing nut 44. The block 42 is positioned between the axial beam 30 and the wing nut 46.

When the wing nuts 44 and 46 are turned in a clockwise fashion, they exert pressure against the blocks 40 and 42 respectively which likewise exert pressure against the axial beam 30. The pressure exerted by the wing nuts and blocks tends to urge the axial beam 30 towards the L-shaped bases 18 and 20. The means for positioning the axial beam 30 further includes a handle means 50 and 52 respectively mounted on each of said bolts 16 and 17 for rotation thereof.

The welding clamp 12 further includes a means for positioning the brace 26 relative to the beam 30. The means for positioning the brace includes a first nut 51 threadably engaging the longitudinal shaft 29. The first nut 51 is positioned between the brace 26 and the beam 30. When the wing nuts 44 and 46 are turned in a clockwise fashion, they urge the beam 30 into engagement with the first nut 51 thereby exerting pressure along the longitudinal shaft 29 to the mounting bracket 26, thus holding the beam attachment 28 firmly against the embed 10.

The means for positioning the brace 26 further includes a second nut 54 which threadably engages the longitudinal shaft 29. The second nut 54 is located opposite the beam 30 from the first nut 51. When the second nut 54 is rotated clockwise and the first nut 51 is rotated counter-clockwise, they firmly engage and lock longitudinal shaft 29 in a fixed position vis-a-vis the axial beam 30. This locking feature is useful when a number of beam attachments 28 of the same height are being welded in sequential fashion. In other words, the brace 26 and the longitudinal shaft 29 stay adjusted to the same height when the welding clamp 12 is being moved from location to location.

Figure 8:
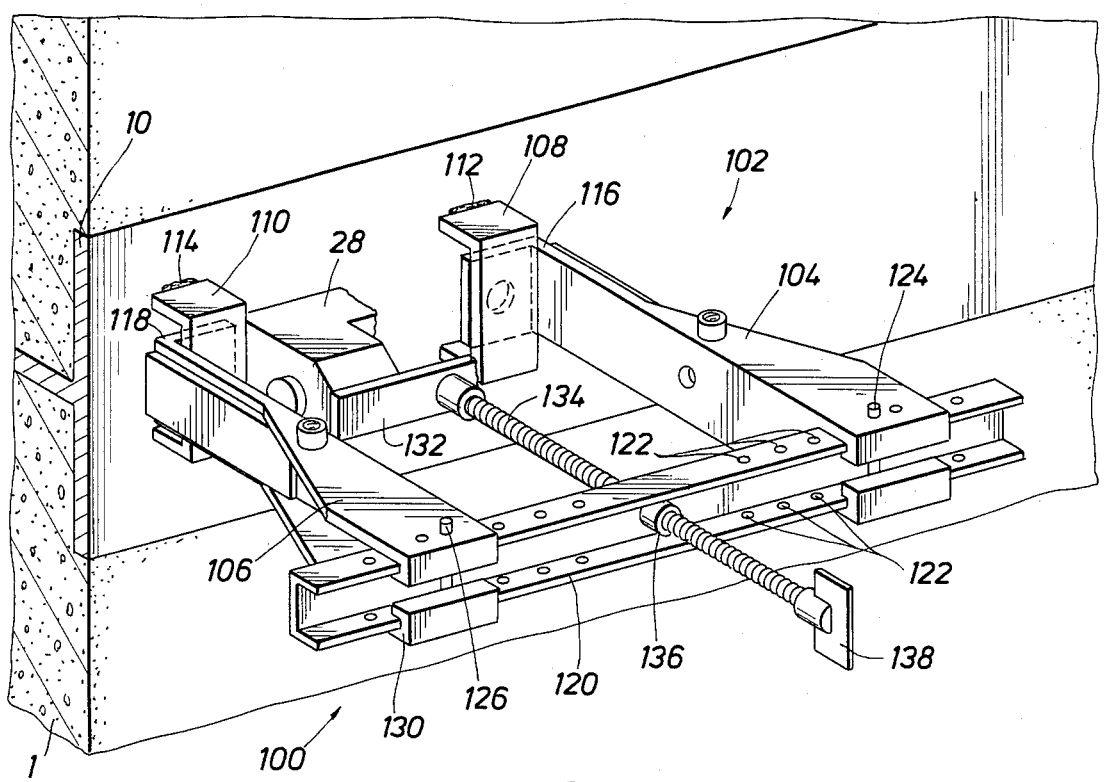
FIG. 8 is a perspective view of the alternative embodiment of the welding clamp attached to an embed in a vertical concrete wall.

In an alternative embodiment, the means for positioning the brace 26 can consist of a female fitting mounted in the beam 30 to threadably engage the longitudinal shaft 29. Such a female fitting 136 is shown in FIG. 8. In addition, a handle means can be likewise mounted on the shaft 29 for rotation thereof, also seen in FIG. 8.

In another alternative embodiment, the means for positioning the beam on the longitudinal rod means can consist of a pair of female fittings mounted in the beam 30 similar to the female fitting 136 shown in FIG. 8. In this configuration, the female fittings, not shown in the drawings, would threadably engage the bolts 16 and 17. These female fittings engaging the bolts 16 and 17 would serve the same function as the wing nuts 44 and 46 and the blocks 40 and 42 as a means for positioning the beam on the rod means.

Figure 2:
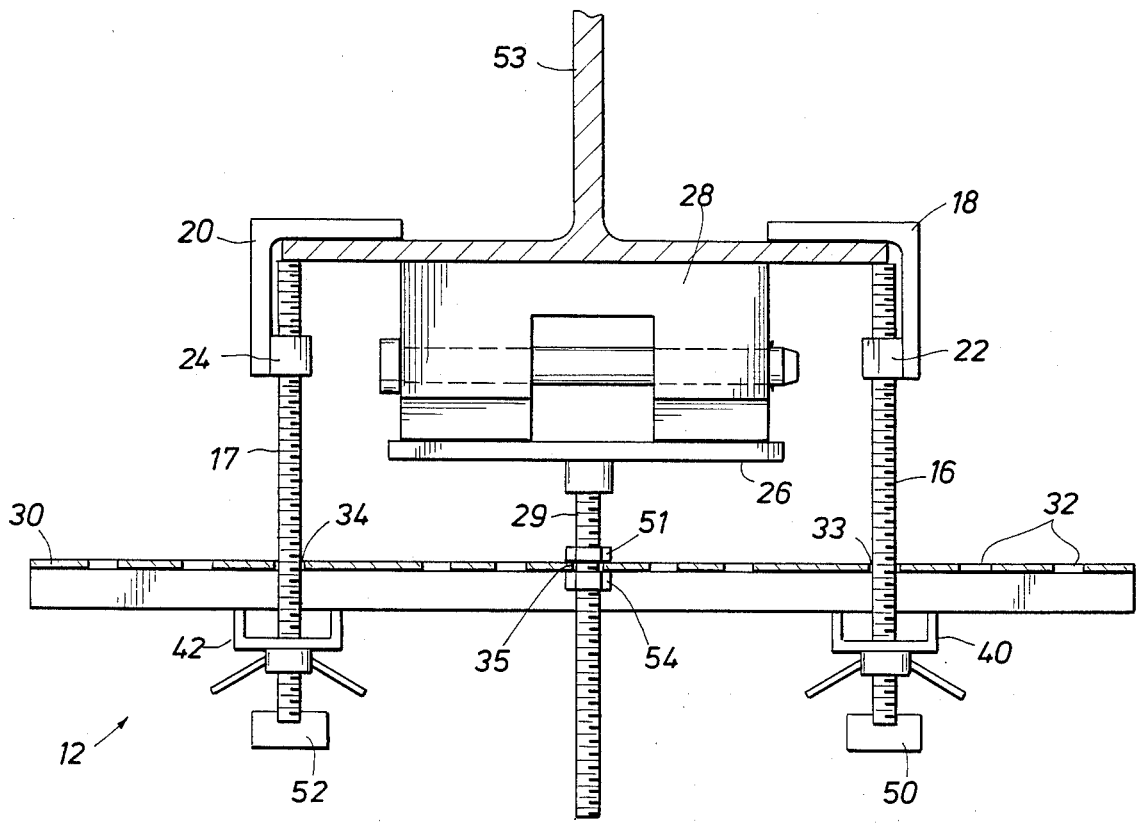
FIG. 2 is a partial cross-sectional view of the welding clamp hanging horizontally from an I-beam.

In FIG. 2, the welding clamp 12 is shown mounted in a horizontal position on an I-beam 53. The L-shaped bases 18 and 20 fit over the edge of the I-beam 52. The elongate bolts 16 and 17 pass through the fittings 22 and 24 and contact the I-beam 53 gripping it between the L-shaped bases 18 and 20. The mechanical grip on the I-beam 53 provides a safe support for the welding clamp 12. A partial section view of the axial beam 30 is shown in this figure. The plurality of holes or perforations 32 are clearly shown in this figure. The rod 16 is shown passing through one of the plurality of perforations which is identified for the sake of clarity by the numeral 33. The rod 17 is likewise shown passing through another of the plurality of perforations identified for the sake of clarity by the numeral 34. The shaft 29 is shown passing through another of the plurality of perforations identified for the sake of clarity by the numeral 35. All of the perforations, 32, 33, 34 and 35 are sized to allow the rods 16 and 17 and the longitudinal shaft 29 to pass therethrough.

In FIG. 3 a C-shaped channel member 60 is temporarily held in place by tack welds to the embed 10 as better shown in FIG. 4. The L-shaped base 20 fits inside the C-shaped channel member 60 and is gripped therebetween by the rod 17.

In FIG. 4, the tack weld 62 is shown attaching the C-shaped channel member 60 to the embed 10. In practice, a pair of C-shaped channel members would be used in conjunction with the pair of L-shaped bases to support the welding clamp 12. The first C-shaped channel member would be releasably gripped between the L-shaped base 20 and the rod 17 as shown in FIGS. 3 and 4. The second C-shaped channel member would be releasably gripped between the L-shaped base 18 and the rod 16, not shown in the drawings.

In FIG. 5, an alternative embodiment is shown of the L-shaped base 20. An anchor 64 is shown mounted in the concrete wall 1 and passing through the embed 10. A perforation 66 is formed in the L-shaped base 20 which allows the anchor 64 to pass therethrough. A nut 68 is sized to threadably engage the anchor 64. The L-shaped base 20 mechanically gripped between the nut 68 and the embed 10. This alternative mounting bracket means is, of course, only applicable to those situations which have anchors installed into the wall 1 or suspended from a ceiling or other supporting structure.

In FIG. 6, a welding fixture is generally identified by the numeral 75 and is an alternative embodiment of the welding clamp 12 generally shown in FIGS. 1–5. Common components of these two embodiments will be identified with the same numerals previously used in FIGS. 1–5. Other components will be assigned different numerals. The welding fixture 75 includes a clamp means 76 having longitudinal rod means extending therefrom. As shown, the longitudinal rod means includes a pair of elongate bolts respectively identified by the numerals 16 and 17. The axial beam 30 engages the rod means by allowing the bolts 16 and 17 to pass therethrough as shown in FIG. 2. The blocks 40 and 42 have perforations therein allowing the rods 16 and 17 to pass therethrough. The nuts 44 and 46 threadably engage the rods 16 and 17. The blocks 40 and 42 and the wing nuts 44 and 46 are a means for positioning the beam 30 on the rod means. The beam 30 has a plurality of perforations 32 therein allowing the bolts 16 and 17 to pass therethrough.

The clamp 76 engages a tubular member 78 and presses it firmly against an end bracket 80. The tubular member 78 has a bevel 82 and the end bracket likewise has a bevel 84 which are formed along the line of contact between the tubular member 78 and the end bracket 82. A welding bead 86 is placed in this bevel to firmly secure the tubular member to the end bracket.

The welding fixture 75 further includes a means for positioning the beam 30 on the rod means 16 and 17. The means for positioning the beam includes the pair of blocks 40 and 42, and the wing nuts 44 and 46 which threadably engage respectively rods 16 and 17. When turned in a clockwise fashion, the wing nuts 44 and 46 urge the axial beam 30 into engagement with the end bracket 80 which is held firmly against the tubular member 78 which is firmly gripped by the clamp 76.

In FIG. 7, the clamp 76 is shown with the tubular member 78 in cross section. The clamp 76 has an adjustable shaft 88 which releasably grips the object to be welded which is in this drawing is the tubular member 78. The shaft 88 threadably engages a fitting 90 in the clamp 76. A foot 92 is formed on the end of the shaft 88 to better support and engage the tubular member 78. A handle 93 is formed on one end of the shaft 88 opposite the foot 92 for manual adjustment thereof. A second foot 94 is mounted on the clamp 76 opposite the shaft 88 to provide a stop for firmly gripping the tubular member 78 between the first foot 92 and the second foot 94.

In FIG. 8, an alternative embodiment of the welding clamp is generally identified by the numeral 100. The welding clamp 100 includes mounting bracket means generally identified by the numeral 102 which has a pair of arms 104 and 106 extending therefrom. The mounting bracket means 102 further includes a pair of C-shaped channel members identified respectively by the numerals 108 and 110. The C-shaped channel members 108 and 110 are temporarily mounted on the embed 10 by one or more tack welds 112 and 114. A pair of L-shaped bases 116 and 118 extend respectively from arm 104 and 106 and form a part thereof. The L-shaped base 116 is shown in partial phantom view hidden behind the C-shaped channel member 108. Likewise, the L-shaped base 118 is shown in partial phantom view behind the C-shaped channel member 110. The L-shaped bases 116 and 118 respectively engage the C-shaped channel members 108 and 110, as shown in the drawing.

In some situations, the C-shaped channel members 108 and 110 could be dispensed with and the L-shaped bases 116 and 118 could be directly tack welded to the embed 10. This, of course, would reduce the life of the L-shaped bases because of the repeated grinding necessary in order to remove the welding clamp 100 after installation of each beam attachment 28. Use of expendable C-shaped channel members 108 and 110 is therefore the preferred method of attaching the welding clamp 100 to the embed 10.

The welding clamp 100 further includes an axial beam 120 which adjustably engages the arms 104 and 106. The beam 120 has a plurality of perforations 122 therein which are sized to receive a first pin 124 and a second pin 126. The pins 124 and 126 pass through holes in the arms 104 and 106 and the plurality of holes 122 in the beam 120 thereby locking the position of the arms relative to the beam.

As will be understood by one skilled in the art, the arms 104 and 106 have an L-shaped contour identified by the numeral 130 which fits around and engages the beam 120. The L-shaped contour, in conjunction with the C-shape of the beam 120, allows the arms to move adjustably along the longitudinal length of the beam 120. They can be aligned with any of the plurality of perforations 122 and secured respectively by the pins 124 and 126.

The welding clamp 100 further includes a brace 132 having a longitudinal shaft 134 extending therefrom. A female fitting 136 is mounted in the beam 120 and is contoured to threadably engage and receive the longitudinal shaft 134. A handle means 138 is mounted on one end of the longitudinal shaft 134 opposite the brace 132. By turning the handle means 138, the brace 132 can be positioned and adjusted relative to the beam 130. As shown in this figure, the brace 132 contacts the beam attachment 28 which is firmly held in place against the embed 10 for purposes of preheat and/or welding. When the brace 132 is properly adjusted, it urges the beam 120 and the arms 104 and 106 into firm mechanical engagement with the C-shaped channel members 108 and 110 respectively.

Figure 9:
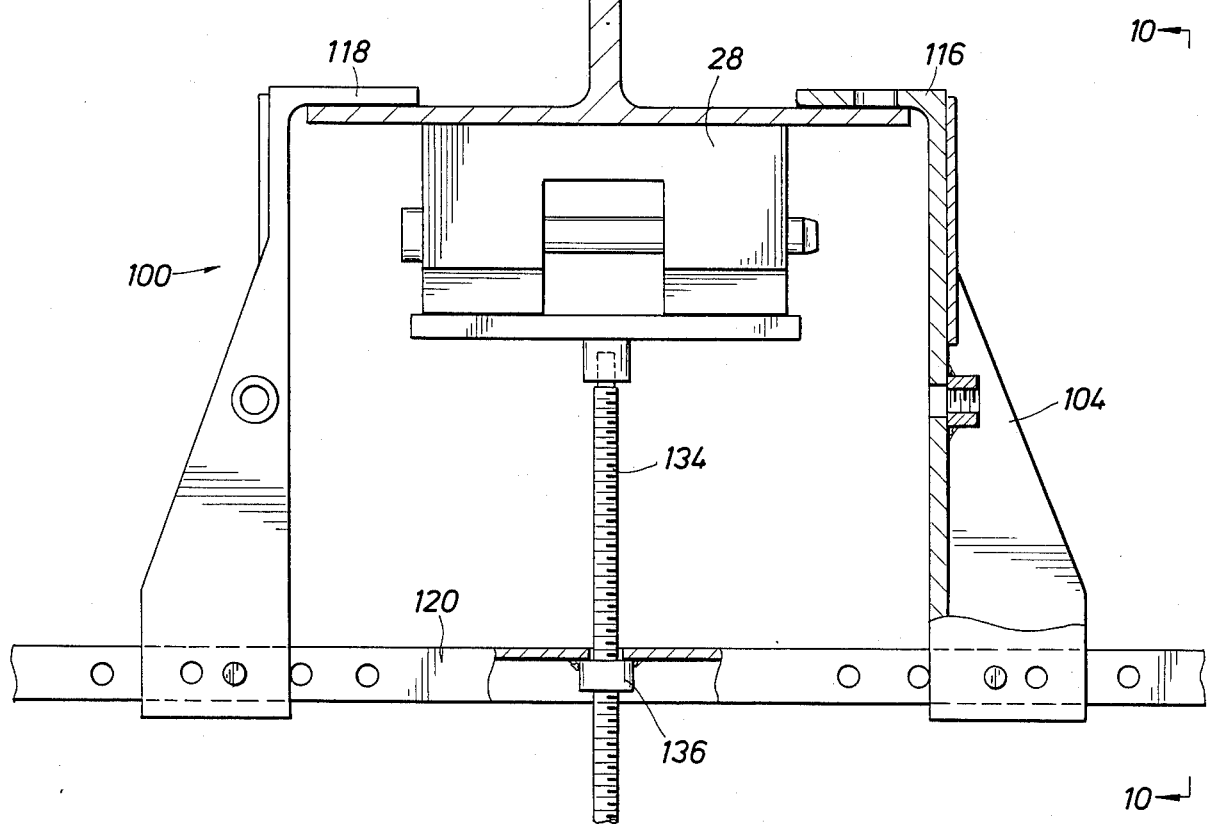
FIG. 9 is a partial cross-sectional view of the alternative embodiment of the welding clamp hanging from a horizontal I-beam.

FIG. 9 shows the welding clamp 100 hanging in a horizontal position from an I-beam 150. The L-shaped bases 116 and 118 engage the edges of the I-beam 150 and provide a safe means for holding the beam attachment 28 against the I-beam 150. The arm 104 is shown in partial section view. Likewise, the beam 120 is shown in partial section view revealing the female fitting 136 and the shaft 134. When the shaft 134 is properly adjusted, it pushes against the brace 132 which pushes against the beam attachment 28 which causes the clamp 100 to be rigidly connected to the I-beam 150.

In FIG. 10, the welding clamp 100 is shown along the lines 10—10 of FIG. 9. The axial beam 120 is shown in section view. The arm 104 has two L-shaped contours 130 which surround and engage the beam 120. The pin 124 passes through the arm 104 engaging and locking the arm onto the axial beam 120. The longitudinal shaft 134 is shown protruding below the arm 104.

In FIG. 11, the arm 104 and the L-shaped base 116 are shown in attachment to an anchor 152 which is embedded in the concrete wall 1. The L-shaped base 116 is mechanically gripped between the nut 154 and the concrete wall 1. This type of mounting is shown as an alternative to the tack weld form of mounting shown in FIG. 8 or the horizontal suspension of FIG. 9.

In FIG. 12, an alternative embodiment of the welding fixture is generally identified by the numeral 175. The welding fixture consists of a clamp means generally identified by the numeral 176 which has a longitudinal rod means extending therefrom and identified by the numerals 178 and 180.

The welding fixture 175 further includes an axial beam 182 engaging the rod means 178 and 180. The beam 182 is shown in partial perspective view whereby the rod means 178 passes through an opening 184 in the beam 182. A first wing nut 186 and a second wing nut 188 threadably engage the rods 178 and 180 and provide a means for positioning the beam 182 on the rod means. The clamp means 176 engages a tubular member 78 which is pressed against an end bracket 80. A bevel 190 is formed on the tubular member 78 and likewise a second bevel 192 is formed on the end bracket 80. A welding bead 194 joins the tubular member 78 to the end bracket 80.

In FIG. 13, the clamp 176 is shown along the lines 13—13 of FIG. 12. The clamp 176 has a first shaft 190 and a second shaft 192 for releasably gripping the object to be welded which, as shown in this figure, is a cross section of the tubular member 78. The shaft 190 passes through a female threaded fitting 194 and shaft 192 passes through a similar female threaded fitting 196, not shown in FIG. 13. A handle means 198 is formed on one end of the shaft 190 and a foot 200 is formed on the opposite end. A second handle means 202 is formed on one end of the shaft 192 and a foot 204 is formed on the other end thereof. When the shaft 190 and 192 are extended, the feet 200 and 204 mechanically grip the object to be welded which in this case as shown in FIG. 13, is the tubular member 78.

OPERATION OF THE PREFERRED EMBODIMENT

When a beam attachment 28 is to be welded to an embed 10 in a vertical wall in a nuclear power plant or other situation where accuracy is important, the welding clamp 12, as shown in FIG. 1, is particularly useful. The beam attachment can typically weight from 1 to 30 pounds. First, the surface of the embed is ground to remove rust, paint, and/or other foreign matter. Pencil lines are then drawn on the embed to precisely target where the beam attachment 28 is to be located. The welding clamp 12 is then manually held in place over the target area while the L-shaped bases 18 and 20 are tack welded to the embed. Once the tack welds are cool, the welding clamp is self-supporting. The L-shaped bases are welded near, but not in the target area. Next, the beam attachment 28 is manually positioned on the target area. The brace 26 is adjusted to firmly press the beam attachment 28 against the embed 10. In the alternative, if the height of the brace has been preadjusted, the wing nuts 44 and 46 may be tightened to bring the brace 26 into firm contact with the beam attachment 28 against the embed 10. If preheat is required, the embed 10 and the beam attachment are flamed while being held by the welding clamp 12. A temperature stick is typically applied to verify that the correct preheat temperature has been reached. Tack welds are then applied to join the embed 10 to the beam attachment 28. The tack welds are then cleaned and the position of the beam attachment 28 is double checked. The attachment 28 must also form a flush fit against the embed 10. If the position is correct and the attachment is flush, the weld will be completed while both the embed and attachment are still hot. After the weld is complete, the back welds along the L-shaped base 18 and 20 can be ground off and the clamp 12 can be removed from the embed 10. From time to time, the bases 18 and 20 will need to be replaced because of the repeated tack welding and grinding at each location.

The clamp 12 can also be used in situations which do not require preheat. When it is necessary to weld a beam attachment 28 to the underside of an exposed I-beam, the clamp 12 can be used as shown in FIG. 2. In this situation, the L-shaped bases 18 and 20 need not be tack welded to the I-beam.

The alternative embodiment shown in FIGS. 8–11 is a heavy duty version of the clamp shown in FIG. 1. The clamp 100 of FIG. 8 is not as adjustable as the clamp 12. The clamp 100 can be adjusted to grip various sized structures by means of the shaft 134 within the range of movement limited by the length of the arms 104 and 106. The clamp 100 can be attached to an embed 10 by means of C-shaped channel members temporarily tack welded to the embed 10 or by directly welding the L-shaped bases to the embed 10. The use and operation of the clamp 100 will be readily understood from the drawings by one skilled in the art.

The welding fixture 75 shown in FIGS. 6 and 7 and the alternative embodiment 175 shown in FIGS. 12 and 13 as best suited for applications involving a tubular member. Operation of these fixtures will be understood from the drawings by one skilled in the art.

The welding clamps and welding fixtures disclosed herein can be used in nuclear power plants where accuracy is critical, as well as other applications too numerous to discuss herein.

While the foregoing is directed to the preferred embodiments of the present invention, other and further embodiments of the invention may be devised without departing from the basic scope thereof, and the scope thereof is determined by the claims which follow.

What is claimed is:

1. A welding clamp comprising:
   (a) mounting bracket means having a pair of base elements each adapted to establish restraining relation with a structural member on which an attachment is to be welded, said base elements each forming an internally threaded opening, said mounting bracket means further having longitudinal rod means extending therefrom and having threaded connections with said internally threaded opening;
   (b) a brace having a longitudinal shaft extending therefrom;
   (c) an axial beam forming openings, receiving said rod means and said longitudinal shaft;
   (d) a pair of blocks surrounding each of said bolts and a pair of nuts to threadably engage each of said bolts, said blocks being positioned between said beam and said nuts and being urged by said nuts for positioning said beam on said rod means; and
   (e) means securing said brace to said beam and being adjustable for positioning said brace relative to said beam.

2. The apparatus of claim 1 wherein said base elements are of L-shaped configuration forming a portion adapted to engage said structural member 3. The apparatus of claim 2 wherein said rod means includes a pair of elongate bolts each threadably engaging said internally threaded openings of respective ones of said L-shaped bases.

4. The apparatus of claim 3 wherein said means for positioning said beam further includes handle means mounted on each of said elongate bolts for rotation thereof.

5. The apparatus of claim 3 wherein said means for positioning said brace comprises a nut threadably engaging said longitudinal shaft, said nut being positioned between said brace and said beam.

6. The apparatus of claim 3 wherein said means for positioning said brace comprises a pair of 51, 54 of nuts threadably engaging said longitudinal shaft, the first of said nuts being positioned between said brace and said beam, and the second of said nuts being positioned on the opposite side of said beam from said first nut.

7. The apparatus of claim 3 wherein said axial beam includes a plurality of passages sized to receive said elongate bolts.

8. The apparatus of claim 2 wherein each of said L-shaped bases are temporarily mounted on said structural member by one or more track welds.

9. The apparatus of claim 2 wherein said L-shaped bases are contoured to receive a protruding anchor for temporary mounting purposes.

* * * * *